United States Patent
Walker et al.

(10) Patent No.: US 6,213,264 B1
(45) Date of Patent: Apr. 10, 2001

(54) SEALING ARRANGEMENT FOR BRAKE CAMSHAFT

(75) Inventors: Donald G. Walker, Troy; David J. Dettloff, Utica; David J. Edwards, Shelby Township, all of MI (US)

(73) Assignee: Meritor Heavy Vehicle Systems, L.L.C., Troy, MI (US)

( * ) Notice: Subject to any disclaimer, the term of this patent is extended or adjusted under 35 U.S.C. 154(b) by 0 days.

(21) Appl. No.: 08/730,370

(22) Filed: Oct. 15, 1996

(51) Int. Cl.$^7$ ................................................... F16D 51/00
(52) U.S. Cl. .............................................. 188/329; 188/341
(58) Field of Search ................................... 188/324, 329, 188/330, 332, 338, 339, 340, 79.51, 79.55, 146 R

(56) References Cited

U.S. PATENT DOCUMENTS

| | | | |
|---|---|---|---|
| 3,076,531 | 2/1963 | Hanley et al. | 188/205 |
| 3,367,458 | 2/1968 | Self et al. | 188/206 |
| 3,368,648 | 2/1968 | Brownyer | 188/78 |
| 3,497,037 | 2/1970 | Deibel | 188/78 |
| 3,677,374 | 7/1972 | Newstead et al. | 188/329 |
| 4,476,968 | 10/1984 | Urban et al. | 188/329 |
| 4,905,800 | 3/1990 | Mathews | 188/329 |
| 4,981,200 | 1/1991 | Gee | 188/341 |
| 5,044,475 | 9/1991 | Clark | 188/329 |
| 5,062,506 | 11/1991 | White | 188/329 |

FOREIGN PATENT DOCUMENTS

| | | |
|---|---|---|
| 40 34 359A1 | 4/1992 | (DE) . |
| 03 06 851A2 | 3/1989 | (EP) . |
| 04 08 254A1 | 1/1991 | (EP) . |
| WO96/25313 | 8/1996 | (WO) . |

*Primary Examiner*—Matthew C. Graham
(74) *Attorney, Agent, or Firm*—Howard & Howard

(57) ABSTRACT

An improved camshaft sealing arrangement includes seals at each end of the camshaft housing. In addition, seals and washers are positioned between the camshaft and the slack adjuster connection. The combined seals provide a camshaft that is less likely to require maintenance than prior art camshafts. The seal adjacent the cam contacts an outer periphery of the camshaft housing. This seal also provides a thrust bearing washer surface against the camshaft. The seals between the camshaft and the slack adjuster include washers to properly secure and position the seals, the camshaft and the slack adjuster.

21 Claims, 3 Drawing Sheets

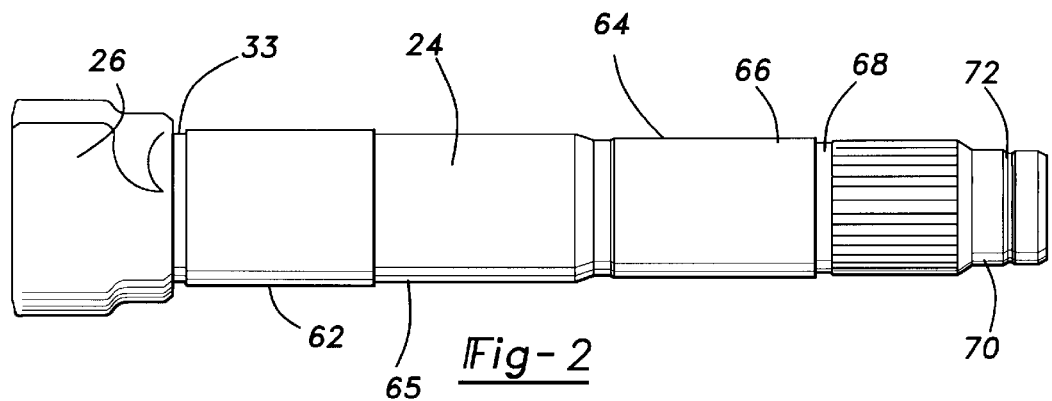
Fig-2
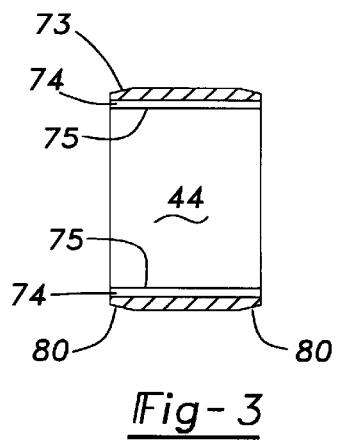
Fig-3
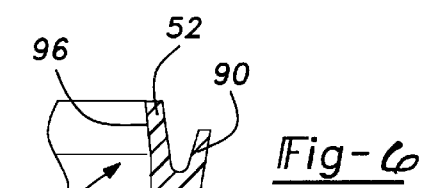
Fig-6
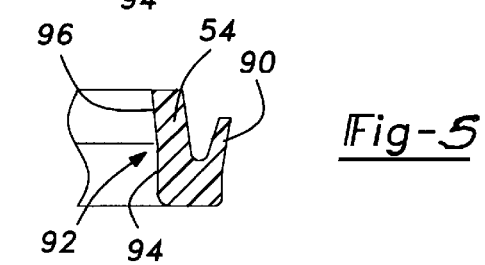
Fig-5
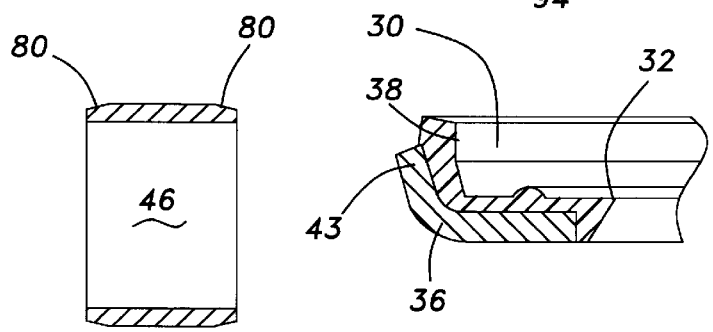
Fig-8
Fig-4
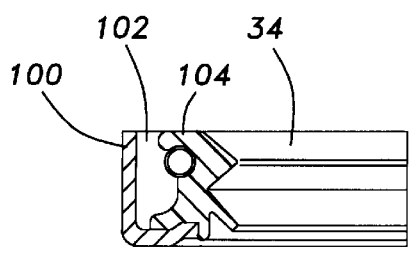
Fig-7

SEALING ARRANGEMENT FOR BRAKE CAMSHAFT

BACKGROUND OF THE INVENTION

This invention relates to an improved sealing and support arrangement for the camshaft of a cam brake system.

Cam brakes arc used to brake heavy vehicles such as trucks, by moving brake linings into contact with a brake drum upon rotation of a cam. The cam is typically in the form of an "S" shape. The cam rotates to force rollers radially outwardly, which then move the brake linings into contact with the drum. A camshaft, which rotates the cam, is rotated by an air brake actuator, typically through a connection with a slack adjuster. The camshaft must withstand very high forces as it is rotated to actuate the brake, and thus must be securely and properly mounted within its housing. In addition, lubrication of the camshaft to insure proper rotation is also necessary. In the prior art, seals and bearings have been provided between the camshaft, its housing and the slack adjuster; however, the seals and bearings have not always adequately mounted and sealed the camshaft. Rather, prior art camshafts have required frequent maintenance.

In addition, the connection between the slack adjuster and the camshaft has presented some difficulties. A large amount of rotational force is passed between the two members. Proper position and adequate sealing are also important at this connection, and yet sometimes difficult to achieve.

SUMMARY OF THE INVENTION

A disclosed embodiment of this invention includes a camshaft mounted within a housing, and provided with unique seals at each axial end. In addition, the camshaft is provided with specially machined surfaces to properly position its seals and bearings.

The camshaft is preferably provided with two bearings, with the bearing mounted closest to the slack adjuster being smaller than the outer bearing. The camshaft locations which support the bearings are provided with surface treatment, only at the location of contact within the bearing. In this way, the invention reduces the amount of material that must be surface treated, thus reducing cost.

In addition, the camshaft has a relatively large outer diameter at one end, near the cam, then moves to smaller diameters in a direction from the cam and towards the slack adjuster. In this way, the camshaft may be moved through the housing and into the bearings and seals with little difficulty. The progressively larger portions of the camshaft will move through the larger seals, bearings, etc., until the proper sized portion comes into alignment with the seal, bearing, etc. This feature of the invention provides improved assembly characteristics.

In a preferred embodiment of this invention, a first seal is placed between the camshaft and the housing at the cam end. The first seal has a lip contacting the camshaft, and a second lip extending radially outwardly to contact a radially outward surface of the camshaft housing. The outer seal prevents dirt, dust or other impurities from entering the housing. This first seal preferably also includes a bearing washer contacting the cam to provide a thrust washer surface for the cam. The first seal preferably does not rotate with the camshaft, but remains fixed with the camshaft housing. This seal, in combination with other seals at the other end of the camshaft housing, insure a camshaft and housing arrangement that is virtually maintenance free during the expected life of the brake system. The system is initially lubricated and the seals prevent leakage out of the housing. The seals prevent ingress of impurities to provide a dirt free environment within the camshaft housing such that no maintenance should be necessary.

In addition, the connection between the slack adjuster and the camshaft is also provided with seals. These seals insure that the lubrication between these two members also enjoys an unusually long life. Preferably seals are provided at each end of the connection between the camshaft and the slack adjuster.

In addition, the seals between the slack adjuster and the camshaft are each associated with washers which assist in positioning the slack adjuster on the camshaft. An outer snap ring abuts an outer washer holding the slack adjuster against the outer end of the camshaft housing. A second washer is positioned intermediate the camshaft housing and the slack adjuster, and provides a thrust washer surface. The combined washers provide proper positioning of the slack adjuster on the camshaft.

These and other features of the present invention can be best understood from the following specification and drawings, of which the following is a brief description.

DESCRIPTION OF THE DRAWINGS

FIG. 2 is a side view of the camshaft.

FIG. 3 is a side view of one bearing incorporated into this invention.

FIG. 4 shows another bearing incorporated into this invention.

FIG. 5 is a cross-sectional view of one seal incorporated into this invention.

FIG. 6 is a c ross-sectional view of another seal incorporated into this invention.

FIG. 7 shows another seal incorporated into this invention.

FIG. 8 shows another seal incorporated into this invention.

DETAILED DESCRIPTION OF A PREFERRED EMBODIMENT

Figure 1A:
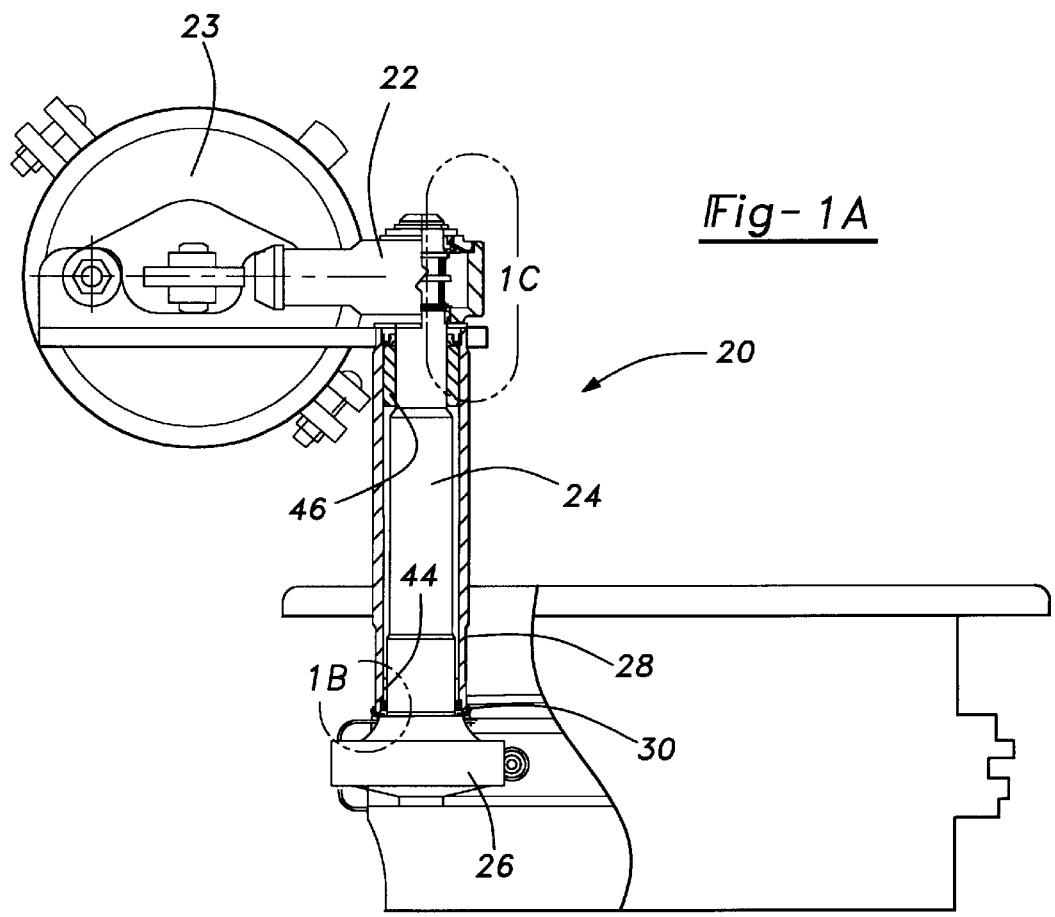
FIG. 1A is a cross-sectional view of a camshaft, housing, and slack adjuster arrangement.

A camshaft assembly 20 is illustrated in FIGS. 1A, B and C. As known, a slack adjuster 22 is connected to a brake actuator 23 to provide a rotational force to a camshaft 24. Camshaft 24 is fixed to rotate with a cam 26 which in turn actuates a cam brake system, as known.

Figure 1B:
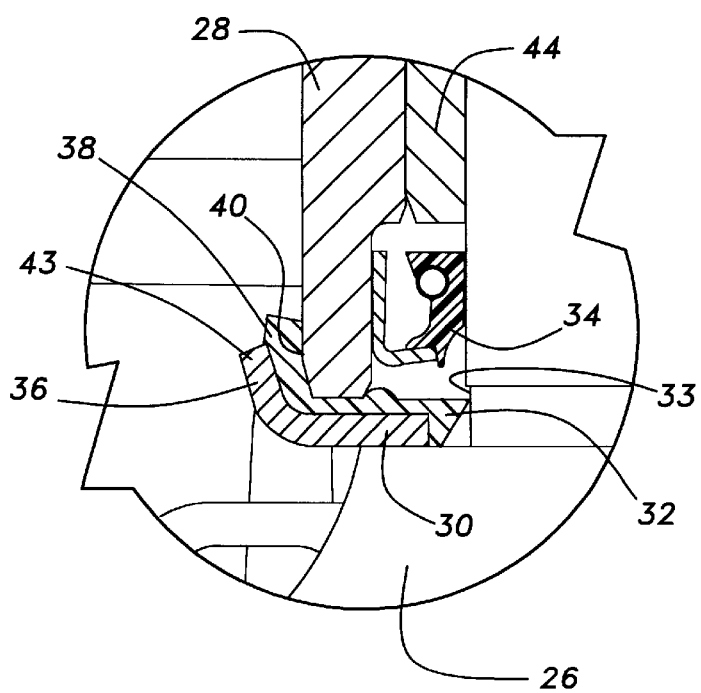
FIG. 1B shows one detail of the FIG. 1A system.

A camshaft housing 28 securely mounts the camshaft 24. A first seal 30 is provided at a cam end of the housing 28, and between the housing 28 and the camshaft 24. As shown in FIG. 1B, a radially inner lip portion 32 of the seal 30 seals against an outer periphery 33 of the camshaft 24. An axially inner grease seal 34 is provided. Seal 34 provides a back-up to the seal 30 in the event seal 30 should begin to fail. An outer washer portion 36 of the seal 30 provides a thrust washer surface against the cam 26. An outer sealing lip 38 is forced against an outer peripheral surface 40 of the housing 28. Thus, sealing lip 32 seals at outer peripheral surface 33 of camshaft 24 while lip 38 seals outer surface 40. The seal 30 does not rotate with the camshaft, and the metal washer portion 36 provides a thrust washer surface. A shroud position 43 of the metal portion is sized to secure seal 30 on the housing and to force lip 38 against surface 40. Shroud 43 also provides a guide for the brake shoe rollers to assume proper alignment of the brake shoes. The sealing at the outer periphery of the housing 28 and at the outer periphery of the shaft 24 provides a very reliable seal at this end of the assembly.

Figure 1C:
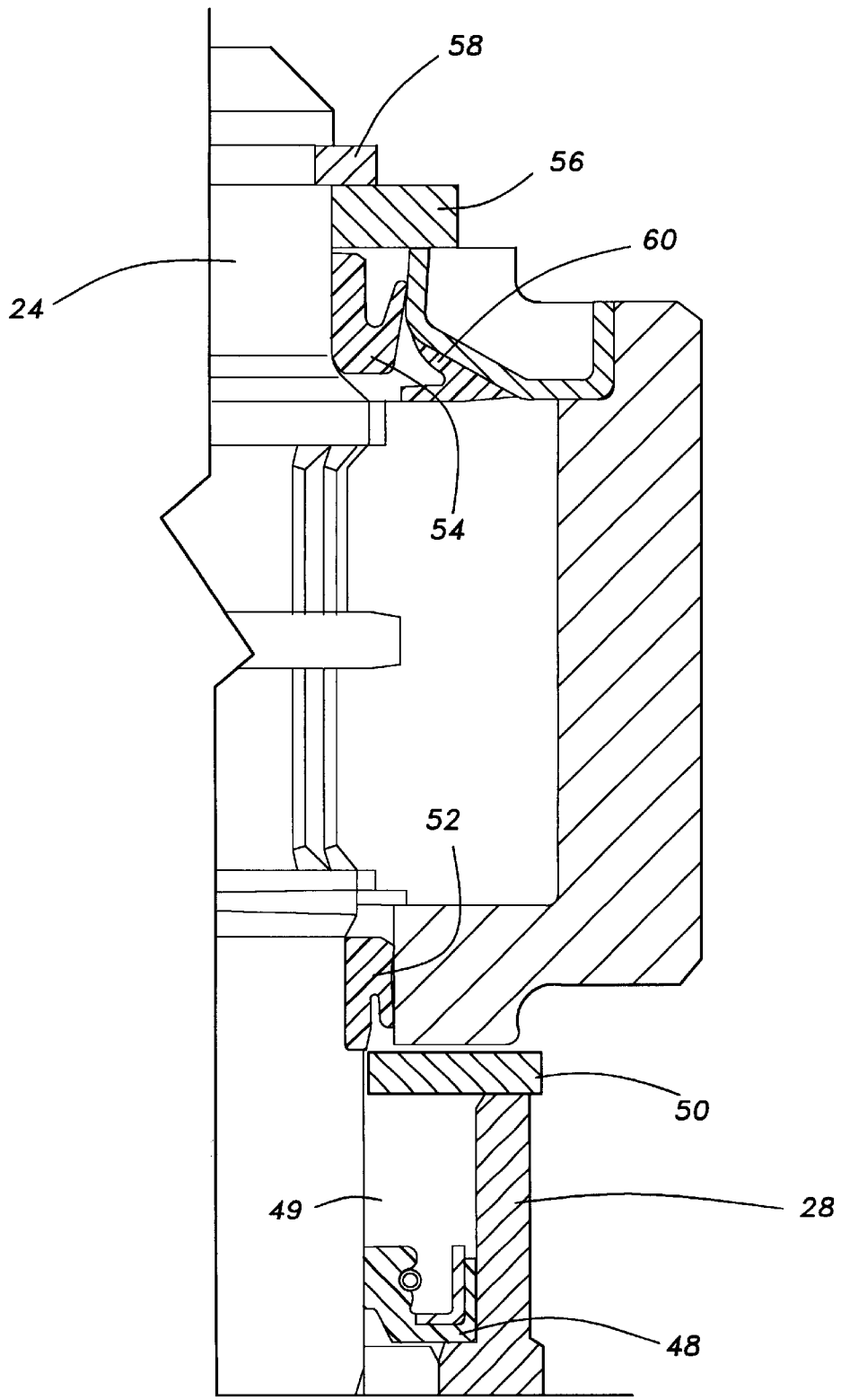
FIG. 1C shows another detail of the system shown in FIG. 1A.

A bearing 44 is mounted axially inwardly of seal 34. Bearing 44 is radially larger than an inner bearing 46, which is mounted at a side of camshaft 24 adjacent slack adjuster 22. As shown in FIG. 1C, a seal 48, a space 49 filled with grease, and a washer 50 are positioned adjacent the end of the camshaft housing 28. Slack adjuster 22 is mounted to an end of the camshaft 24, and the seal 52 is mounted within the slack adjuster 22 mounting portion, to seal against the camshaft 24. A second seal 54 is mounted at the opposed end, and a washer 56 is mounted outwardly of seal 54. A snap ring 58 holds the washer 56 and seal 54 at that end of the camshaft 24. Seal 54 seals between an outer seal 60 and a camshaft 24. This arrangement provides a positive seal at both ends of the camshaft housing 28 and both ends of the slack adjuster connection to the camshaft. Lubricant is initially dispensed between the ends of housing 28 and also between the seals on the slack adjuster connection. The lubricant within the camshaft housing need not be repeatedly maintained. Instead, after the camshaft housing is initially assembled, the initial lubrication typically survives the expected life of the camshaft housing.

The seals and washer at the connection between the camshaft 24 and the slack adjuster 22 maintain the included lubrication for the expected life of the brake system. The seals and washer at the slack adjustor end of the camshaft are an improvement over the prior art, which typically did not provide the associated seals and washers as shown in this invention.

As shown in FIG. 1C, the washer 50 has an outer peripheral diameter that is greater than the inner peripheral diameter of this end of the camshaft housing 28. Thus, the washer 50 abuts the end of the camshaft housing 28 and provides a stop surface for the slack adjuster 22. The outer snap ring 58 forces washer 56, and the slack adjuster 22 toward the camshaft housing 28 as shown in FIG. 1C. Thus, the combined washers 50 and 56 and the snap ring 58 together ensure proper positioning of the overall assembly.

FIG. 2 is a detail of the camshaft 24. As shown, cam 26 is at one axial end. Recessed surface 33 receives seal 30. A surface 62 is positioned axially inwardly of the surface 33, and receives seal 34, and bearing 44. Bearing 46 is received on surface 66. Surfaces 62 and 66 are provided with a heat treating, as such induction heat treatment. Only the surfaces 62 and 66, and the splines to receive the slack adjuster, need be heat treated, and by defining the locations for the two bearings to be received, the present invention reduces the expense in properly treating the camshaft. Intermediate surface 65 between surfaces 62 and 66 need not be heat treated.

Seal 48 is also positioned outwardly of bearing 46 on surface 66. Washer 50 is received on surface 66. An inner surface 68 receives seal 52, and extends within the slack adjuster 22. Seal 54 seals on surface 70, and washer 56 also seats on surface 70. The snap ring 58 is received in surface 72.

Note that the portion 62 is the radially greatest portion of the camshaft 24. Because of this, the entire camshaft can be moved through the camshaft housing 28, with the bearings and seals already assembled within the camshaft housing 28.

The progressively larger portions will pass through the larger seals, and bearings, until the assembly is properly positioned within both the camshaft housing and the slack adjuster. At that time, snap ring 58 can be snapped onto the end of the camshaft 24 to completely secure the camshaft within its housing and to the slack adjuster.

FIG. 3 shows the bearing 44. Bearing 44 is preferably formed of three layers, with an outer steel layer 73, an inner bronze layer 74, and an innermost coating 75 of Teflon™. The bearing 44 has a greater inner diameter than the bearing 46. FIG. 4 shows the bearing 46, which has a smaller inner diameter than the bearing 44. Chamfered ends 80 are formed at each end of both bearings 44 and 46. The chamfered ends facilitate pressing movement of the bearing into the camshaft housing 28.

FIG. 5 shows the seal 54, which has an outwardly extending lip 90 which contacts an inner peripheral portion of the slack adjuster housing. An inner portion 92 of the seal 54 has a two part step surface with the outer portion 94 being generally cylindrical and an outer portion 96 extending radially inwardly to securely grip on the outer periphery of the camshaft 24. Preferably, the portion 96 extends radially inwardly at a very small angle from portion 94. In one example, the angle is five degrees. The outer periphery of lip 90 is preferably formed at an angle of approximately 25 degrees relative to a center line of the seal 54.

FIG. 6 shows a seal 52, having lip 90 similar to the lip on seal 54, and the inner portions 94 and 96, which are preferably formed at approximately the same angles as the portion on seal 54. The seal from portions 96 of both seals 52 and 54 insure a very good seal at each end of the camshaft 24 within the slack adjuster 22.

FIG. 7 shows grease seal 34. As is known, an outer metal portion 100 surrounds an inner air space 102 and seal portion 104. This seal provides a redundant seal axially inwardly of the seal 30.

Seal 30 is shown in FIG. 8, and includes the metal washer portion 36, and the inner lip 32. The cam abuts the washer 36 as mentioned above. The lip 32 seals on the camshaft 24. The portion 38 is deformed against the outer periphery of the camshaft housing 28 to provide a good seal at that location.

The seal 48 is a grease seal which is similar to that shown in FIG. 7, however, there is not the second sealing lip.

The size of a shroud portion 43 on washer 36 is selected relative to the outer periphery of the camshaft housing 28 such that when the seal 30 is snapped onto the camshaft housing, shroud 43 deforms the seal portion 38 against the outer periphery of the camshaft housing to provide the seal.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A cam, camshaft and housing assembly for a brake comprising:

a camshaft extending generally along an axis, and having a first axial end to be fixed to a slack adjuster, and a second axial end to be fixed to a cam for actuation of a brake system;

a cam fixed to said second axial end of said camshaft;

a slack adjuster fixed to said first end of said camshaft;

a camshaft housing extending along said camshaft and between said first and second end; and a first seal sealing between said camshaft housing and said camshaft adjacent said second end of said camshaft, a second seal sealing between an opposed end of said camshaft housing and said camshaft, a third seal sealing between said slack adjuster and said camshaft outwardly of said second seal, and a fourth seal positioned adjacent said first end of said camshaft and sealing between said camshaft and said slack adjuster, said third seal and said fourth seal being positioned on opposed sides of said slack adjuster.

2. An assembly as recited in claim 1, wherein said first seal includes an outer lip portion sealing on an outer peripheral portion of said camshaft housing.

3. An assembly as recited in claim 2, wherein said first seal includes a metal washer portion abutting said cam.

4. An assembly as recited in claims 3, wherein said metal washer portion includes an axially extending portion extending back over said camshaft towards said first end, said metal portion holding said first seal outer lip against said camshaft housing.

5. An assembly as recited in claim 1, wherein a first washer is positioned on said camshaft between an axial end of said camshaft housing and said third seal, and a second washer is positioned between said fourth seal and said first end of said camshaft.

6. An assembly as recited in claim 5, wherein a snap ring is secured on said camshaft between second washer and said first axial end of said camshaft.

7. An assembly as recited in claim 6, wherein said first washer is positioned between an inner end of said slack adjuster and an end of said camshaft housing, said second washer having an outer diameter greater than an inner diameter of said end of said camshaft housing such that said second washer abuts said end of said camshaft housing.

8. An assembly as recited in claim 7, wherein said first washer has an outer diameter that is greater than an outer diameter of said second washer.

9. An assembly as recited in claim 1, wherein said third and fourth seal having an outer lip extending outwardly of a main seal body at an angle and contacting said slack adjuster to provide a seal.

10. An assembly as recited in claim 9, wherein said third and fourth seals having a two-part inner periphery with a first cylindrical portion and a second portion angled inwardly from said cylindrical part to provide a seal on said camshaft.

11. An assembly as recited in claim 1, wherein a pair of bearings are mounted between said first and second seals, a first bearing being positioned adjacent said first seal and a second bearing being positioned adjacent said second seal, said second bearing having an inner diameter that is less than an inner diameter of said first bearing, and said camshaft having a surface supported within said first bearing and a second surface supported within said second bearing, said surface supported within said second bearing having a smaller outer diameter than said surface supported within said first bearing, and said camshaft having an intermediate surface having an outer diameter between the outer diameter of said first surface and the outer diameter of said second surface, said intermediate portion being positioned axially between said first and second surfaces.

12. An assembly as recited in claim 1, wherein said third and fourth seal having an outer lip extending outwardly of a main seal body at an angle and contacting said slack adjuster to provide a seal.

13. An assembly as recited in claim 12, wherein said third and fourth seals having a two-part inner periphery with a first cylindrical part and a second part angled inwardly from said cylindrical part to provide a seal on said camshaft.

14. An assembly as recited in claim 1, wherein there is a fifth seal positioned adjacent said first seal, and in a direction spaced toward said second seal.

15. A camshaft and housing for a brake comprising:

a camshaft extending generally along an axis, and having a first axial end to be fixed to a slack adjuster member, and a second axial end to be fixed to a cam for actuation of a brake system;

a cam fixed to said second axial end of said camshaft;

a slack adjuster affixed to said first end of said camshaft for providing a rotational force to said camshaft;

a camshaft housing surrounding said camshaft;

a first seal including an outer sealing portion sealingly engaged at an outer peripheral surface of said camshaft housing, and an inner sealing lip sealing contacting an outer peripheral surface of said camshaft adjacent said second end of said camshaft, and a second seal positioned at an opposed end of said camshaft housing and sealing between said camshaft housing, and said camshaft, said camshaft housing having an end face extending between inner and outer peripheral surfaces, said first seal extending from said inner sealing lip along and beyond said end face of said housing to said outer sealing portion, said camshaft housing end face being radially inward of said outer peripheral surface, said outer sealing portion wrapping around said end face and contacting said outer peripheral surface of said camshaft housing.

16. A camshaft and housing as recited in claim 15, wherein said first seal includes a metal washer portion for abutting said cam.

17. An assembly as recited in claim 15, wherein said metal washer portion includes an axially extending portion extending back over said camshaft towards said first end, said metal portion holding said first seal outer lip against said camshaft housing.

18. A camshaft and housing for a brake comprising:

a camshaft extending generally along an axis, and having a first axial end to be fixed to an actuation member, and a second axial end to be fixed to a cam for actuation of a brake system;

a camshaft housing surrounding said camshaft;

a cam fixed to said second axial end of said camshaft;

a slack adjuster affixed to said first end of said camshaft for providing a rotational force to said camshaft;

a first washer positioned between an axial end of said camshaft housing and said slack adjuster, said first washer abutting an axial end of said camshaft housing and also abutting an axial end of said slack adjuster;

an outer seal positioned on a side of said first washer spaced from said camshaft housing and sealing the surface between said camshaft and said slack adjuster and an inner seal at an opposed side of said slack adjuster, and also sealing between said slack adjuster and said camshaft;

a second washer positioned between said slack adjuster and said first end of said camshaft; and a snap ring secured between said second washer and said first end of said camshaft, said snap ring holding said second washer on said camshaft and against the second end of said slack adjuster said snap ring also holding said slack adjuster and said first washer on said camshaft, and against said camshaft housing.

19. A camshaft and housing as recited in claim 18, wherein said first washer having an outer diameter which is greater than an inner diameter of said second end of said camshaft housing such that said first washer abuts said second end of said camshaft housing.

20. A camshaft and housing as recited in claim 18, wherein said inner and outer seals having an outer lip extending outwardly of a main seal body and at an angle and contacting said slack adjuster to provide a seal.

21. A camshaft and housing as recited in claim 18, wherein said inner and outer seals having a two-part inner periphery within the first cylindrical part and a second part angled inwardly from said cylindrical part to provide a seal on said camshaft.

* * * * *